(12) United States Patent
Katsuno et al.

(10) Patent No.: US 10,418,675 B2
(45) Date of Patent: Sep. 17, 2019

(54) COOLING STRUCTURE OF BATTERY AND BATTERY UNIT

(71) Applicant: HONDA MOTOR CO., LTD., Tokyo (JP)

(72) Inventors: Sachiko Katsuno, Wako (JP); Yasushi Ogihara, Wako (JP); Suguru Umetsu, Wako (JP); Keishi Kosaka, Wako (JP); Yoshiaki Arai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 668 days.

(21) Appl. No.: 15/093,230

(22) Filed: Apr. 7, 2016

(65) Prior Publication Data

US 2016/0301120 A1    Oct. 13, 2016

(30) Foreign Application Priority Data

Apr. 8, 2015  (JP) ................................ 2015-079400
Apr. 8, 2015  (JP) ................................ 2015-079401

(51) Int. Cl.
| | | |
|---|---|---|
| *H01M 10/663* | (2014.01) | |
| *H01M 10/613* | (2014.01) | |
| *H01M 10/625* | (2014.01) | |
| *H01M 10/6566* | (2014.01) | |
| *H01M 10/6563* | (2014.01) | |

(52) U.S. Cl.
CPC ....... *H01M 10/663* (2015.04); *H01M 10/613* (2015.04); *H01M 10/625* (2015.04); *H01M 10/6563* (2015.04); *H01M 10/6566* (2015.04); *H01M 2220/20* (2013.01)

(58) Field of Classification Search
None
See application file for complete search history.

(56) References Cited

U.S. PATENT DOCUMENTS

2010/0241308 A1    9/2010   Kikuchi et al.

FOREIGN PATENT DOCUMENTS

| CN | 101410261 A | 4/2009 |
|---|---|---|
| JP | 2006-141153 A | 6/2006 |
| JP | 2006-185863 A | 7/2006 |
| JP | 2012-192809 A | 10/2012 |
| JP | 2014-097468 A | 5/2014 |
| JP | 2015-042538 A | 3/2015 |

(Continued)

OTHER PUBLICATIONS

English translation of Nakabachi JP 2014097468 obtained via Google Translate Mar. 25, 2019.*

(Continued)

*Primary Examiner* — Sarah A. Slifka
(74) *Attorney, Agent, or Firm* — Westerman, Hattori, Daniels & Adrian, LLP (57) ABSTRACT

One embodiment provides a cooling structure of a battery, including: a battery; an intake port, from which air in an vehicle interior is taken in; and an intake duct, which is in communication with the intake port and from which the air in the vehicle interior is introduced to the battery, wherein the intake duct is connected with a discharge port of an air conditioning duct, which is connected with an air conditioning system, and from which air discharged from the air conditioning system is introduced.

18 Claims, 8 Drawing Sheets

(56) References Cited

FOREIGN PATENT DOCUMENTS

JP 2004-331024 A 11/2016

OTHER PUBLICATIONS

English translatino of Kida et al JP 2012192809 obtained via Google Translate Mar. 25, 2019.*
Office Action dated Oct. 23, 2018, issued in counterpart Japanese Application No. 2015-079400, with English translation (5 pages).
Office Action dated Oct. 23, 2018, issued in counterpart Japanese Application No. 2015-079401, with English translation (8 pages).
Office Action dated Mar. 20, 2018, issued in counterpart Chinese Application No. 201610212812.1. (7 pages).

* cited by examiner

COOLING STRUCTURE OF BATTERY AND BATTERY UNIT

CROSS-REFERENCE TO RELATED APPLICATIONS

This application claims priority from Japanese Patent Applications No. 2015-079400 filed on Apr. 8, 2015 and No. 2015-079401 filed on Apr. 8, 2015, the entire contents of which are incorporated herein by reference.

FIELD

The embodiments relate, for example, to a cooling structure of a battery and a battery unit in which a battery is housed.

BACKGROUND

Vehicles such as HEVs (Hybrid Electrical Vehicles) and EVs (Electrical Vehicles) include a battery (high-voltage battery) or & battery unit for driving a motor mounted thereon. These kinds of vehicles have a cooling structure for cooling the battery, and air-cooling type cooling structures have been widely adopted.

Fox example, JP-A-2004-331024 discloses a cooling structure for a battery that is placed under a seat in a vehicle interior. The cooling structure is operated under different states by switching the states such as a state where the battery is cooled with the air introduced from the vehicle interior (hereinafter, referred to as vehicle interior air as necessary), a state where the batten is cooled with the air discharged from an air conditioning system (hereinafter, referred to as air-conditioned air, as necessary), and a state where the battery is cooled with the air introduced from a trunk.

In addition, JP-A-2006-141153 describes a cooling method by introducing air, which is discharged from an air conditioning system (hereinafter, referred to as air-conditioned air, as necessary), into a battery unit for cooling the battery proactively in addition to the air that is discharged from the vehicle interior air.

In the cooling structure of the battery described in JP-A-2004-331024, connection to the battery side is made by branching off an air conditioning duct at an intermediate portion of the air conditioning duct that connects an air conditioning system with an air conditioning outlet port open toward the vehicle interior. Thus, it is necessary to provide a changeover valve at a branching portion in order to switch the flow channels, which causes an increase in production cost. In addition, according to the cooling structure of the battery described in JP-A-2004-331024, from the air conditioning outlet port that is originally for discharging air-conditioned air, the vehicle interior air to cool the battery is taken in, or the air after cooling the battery is discharged. This could bring about a strange or uncomfortable feeling to the car passengers.

In addition, in the battery unit described in JP-A-2006-141153, an introduction portion to introduce vehicle interior air and an introduction portion to introduce air-conditioned air have separate configurations, which could cause upsizing of the battery unit. In addition, because the introduction portion to introduce vehicle interior air and the introduction portion to introduce air-conditioned air are spaced apart from each other, a part of the battery is cooled with the vehicle interior air, and the rest of the battery is cooled with the air-conditioned sit or with mixed air of the vehicle interior air and the air-conditioned air, which could cause unevenness of temperature in the air supplied to the battery.

SUMMARY

The first object of the present invention is to provide a cooling structure of battery that is capable of providing efficient cooling with the use of vehicle interior air and air-conditioned air while saving its manufacturing cost.

The second object of the present invention is to provide a battery unit that is compact in size while being capable of cooling the battery with vehicle interior air and air-conditioned air, and suppressing unevenness of temperature in tire air supplied to the battery.

The invention provides following Aspects 1 to 19.

1. A cooling structure of a battery (e.g., a battery 1 in embodiment), including:
   a battery;
   an intake port (e.g., an intake grille 5 in embodiment), from which air in an vehicle interior is taken in; and
   an intake duct (e.g., an intake duct 6 in embodiment), which is in communication with the intake port and from which the air in the vehicle interior is introduced to the battery, wherein
   the intake duct is connected with a discharge port (e.g. a discharge port 101*b* in embodiment) of an air conditioning duet (e.g., an air conditioning duel 100 in embodiment), which is connected with an air conditioning system, and from which air discharged from the air conditioning system is introduced.

2. The cooling structure of the battery according to Aspect 1, wherein
   the discharge port of the air conditioning duct is connected with a joint portion (e.g., a joint portion J in embodiment) disposed on an upstream side of the intake duct.

3. The cooling structure of the battery according to Aspect 2, wherein:
   a part of the air conditioning duct (e.g., an interior-housing air conditioning duct 101 in embodiment) is arranged along the intake duct with facing to each other, and
   the discharge port is disposed at a downstream of the part of the air conditioning duct.

4. The cooling structure of the battery according to Aspect 2 or 3, wherein:
   the battery and the intake duct are housed in a battery housing (e.g., a battery housing P in embodiment) while an interior-housing air conditioning duel (e.g., an interior-housing air conditioning duct 101 in embodiment), which constitutes a part of the air conditioning duct, is also housed in the battery housing; and
   the discharge port is disposed in the interior-housing air conditioning duct.

5. The cooling structure of the battery according to any one of Aspects 1 to 4, wherein
   the discharge port is opposed to the battery.

6. The cooling structure of the battery according to any one of Aspects 1 to 5, wherein
   a one-way valve (e.g., a one-way valve 61 in embodiment) is provided between the intake port and the discharge port, the one-way valve being arranged to regulate an air flow from the discharge port to the intake port.

7. The cooling structure of the battery according to any one of Aspects 1 to 6, wherein
   the air conditioning duct includes a branching portion, one end of the branching portion (e.g. a blanching portion 103 in embodiment), being connected with an air conditioning outlet port (e.g., an air conditioning outlet port 105 in embodiment) that is open toward the vehicle interior, and the other end of the branching portion being connected with the intake duct.

8. The cooling structure of the battery according to Aspect 7, wherein:

the battery is disposed under a rear seat (e.g., a rear seat 12 in embodiment); and the branching portion is disposed inside a center console (e.g., a center console 21 in embodiment), which is provided between a pair of front seats.

9. The cooling structure of the battery according to Aspect 8, wherein a one-way valve (e.g., a one-way valve 107 in embodiment) is provided between the branching portion and the air conditioning outlet port, the one-way valve being arranged to regulate an air flow from the air conditioning outlet port to the branching portion.

10. The cooling structure of the battery according to Aspect 8 or 9, wherein:

a part of the air conditioning duct (e.g., an interior-console air conditioning duct 102 in embodiment) is disposed on a floor panel (e.g., a floor panel F in embodiment), the part includes an erecting portion (e.g., an erecting portion 102c in embodiment), which erects from a bottom surface (e.g., a bottom surface portion 102b in embodiment), and the one end of the branching portion is connected with the air conditioning outlet port via the erecting portion while the other end of the branching portion extends toward the intake duct from the bottom surface.

11. The cooling structure of the battery according to Aspect 10, wherein the branching portion includes a filter member (e.g., a filter member 106 in embodiment).

12. The cooling structure of the battery according to Aspect 11, wherein:

the battery and the intake duct are housed in a battery housing (e.g., a battery housing P in embodiment) while an interior-housing air conditioning duct (e.g., an interior-housing air conditioning duct 101 in embodiment), which constitutes a part of the air conditioning duct, is also housed in the battery housing; and the air conditioning duct includes one of an upward-inclined portion and an upward step (e.g., a step portion 104a in embodiment) between the branching portion and the interior-housing air conditioning duct.

13. The cooling structure of tire battery according to any one of Aspects 10 to 12, further including under the floor panel:

an exhaust pipe (e.g., an exhaust pipe 10 in embodiment); and a muffling part (e.g., a muffling part 10a in embodiment), which is provided to the exhaust pipe, wherein the branching portion is disposed at a position where the branching portion is offset with respect to the muffling part in a front and rear direction.

14. A battery unit (e.g., a battery unit U in embodiment) including:

a battery (e.g., a battery 1 in embodiment);

an intake duct (e.g., an intake duct 6 in embodiment), from which air in a vehicle interior is introduced; and a battery housing (e.g., a battery housing P in embodiment), which is arranged to house the battery and the intake duct, wherein:

the battery housing houses an interior-housing air conditioning duct (e.g., an interior-housing air conditioning duct 101 in embodiment) that constitutes a part of an air conditioning duct (e.g., an air conditioning duct 100 in embodiment), which is connected with an air conditioning system, and from which air discharged from the air conditioning system is introduced, and the intake duct has a vehicle-interior-air introducing port (e.g., a vehicle-interior-air introducing port 6b in embodiment), which is arranged to introduce the vehicle interior air, and an air-conditioned-air introducing port (e.g., an air-conditioned-air introducing port 6c in embodiment), which is arranged to introduce the air discharged from the air conditioning system.

15. The battery unit according to Aspect 14, further comprising an intake port (e.g., an intake grille 5 in embodiment), which is connected with the vehicle-interior-air introducing port, and which is disposed under a seat (e.g., a rear seat 12 in embodiment).

16. The battery unit according to Aspect 15, wherein:

the intake port is disposed adjacent to the vehicle-interior-air introducing port and upstream of the vehicle-interior-air introducing port; and the air-conditioned-air introducing port is disposed adjacent to the vehicle-interior-air introducing port and downstream of the vehicle-interior-air introducing port.

17. The battery unit according to Aspect 16, wherein:

the battery housing includes:

a case (e.g., a case 3 in embodiment), which has a box shape with an opening portion; and a lid member (e.g., a lid member 4 in embodiment), which is arranged to cover the opening portion;

the case and the lid portion are sealed via flange portions (e.g. flange portions 32 and 45 in embodiment) of the case and the lid member;

the intake duct extends above the flange portions;

a cavity (e.g., a cavity A in embodiment) is provided between a vertical wall (e.g., a vertical wall 44 in embodiment) of the lid member and the intake duct; and the interior-housing air conditioning duct is disposed along the flange portions in the cavity.

18. The battery unit according to any one of Aspects 15 to 17, wherein:

the battery housing is disposed on a front lower side of a rear seat (e.g., a rear seat 12 in embodiment); and the intake port is disposed under the rear seat and directed to the vehicle interior.

19. The battery unit according to any one of Aspects 14 to 18, wherein:

the battery includes a plurality of battery modules (e.g., battery modules 11 in embodiment), and the air-conditioned-air introducing port is open toward each of the battery modules.

According to Aspect 1, because the air conditioning duct is connected with the intake duct that is provided to introduce the vehicle interior air, the battery can be cooled with the vehicle interior air and the air-conditioned air in a proactive manner, which prevents from rising temperature, and turns out enhancing the battery performance and the battery life time. In addition, it is unnecessary to provide a changeover valve, which can save the manufacturing cost. In addition, the vehicle interior air is introduced directly from the intake port connected with the intake duct without being introduced through the air conditioning duct, which can prevent from bringing about a strange or uncomfortable feeling to the car passengers.

According to Aspect 2, because the discharge port of the air conditioning duet is connected with the joint portion that is disposed on the upstream side of the intake duct, the vehicle interior air and the air-conditioned air can be mixed on the upstream side of the intake duel, allowing the mixed air to be supplied toward the battery. This configuration can suppress unevenness of temperature in the air supplied to the battery, which can make the cooling temperature for the battery even.

According to Aspect 3, because a part of the air conditioning duct is arranged along the intake duct with facing to each other, and the discharge port is disposed on the downstream of the part of the air conditioning duct, heat exchange between the air conditioning duct and the intake duct can lower the air temperature inside the intake duct.

According to Aspect 4, because the interior-housing air conditioning duct that constitutes a part of the air conditioning duct is housed together with the intake duct in the battery housing, not only the ducts can be protected but also the assembly workability can be improved.

According to Aspect 5, because the discharge port of the air conditioning duct is opposed to the battery, pressure loss can be reduced by directing the air-conditioned air toward the battery.

According to Aspect 6, because the one-way valve arranged to regulate an air flow to the intake port from the discharge port, from which the air-conditioned air is discharged into the intake duct, is provided, the air-conditioned air that flows back can be prevented from being discharged from the intake port, which can prevent car passengers from feeling discomfort.

According to Aspect 7, because the air conditioning duct that is connected with the air conditioning outlet port is branched to introduce the air-conditioned air to the battery, the air-conditioned air can be introduced while the influence on air conditioning can be suppressed, whereby the battery can be cooled in a positive manner. In addition, compared with a case where a dedicated air conditioning duct extending from the air conditioning system is installed in the battery, not only the number of parts of the air conditioning duct can be reduced, but also the increase of weight can be prevented.

According to Aspect 8, because the battery is disposed under the rear seat, and the branching portion of the air conditioning duct is disposed inside the center console, not only the installation of the air conditioning duct can be simplified, but also the influence on the vehicle interior space can be reduced.

According to Aspect 9, because the one-way valve is provided between the branching portion of the air conditioning duct and the air conditioning outlet port, the one-way valve being arranged to regulate an air flow from the air conditioning outlet port to the branching portion, the vehicle interior air to cool the battery can be prevented from being taken in from the air conditioning outlet port that is originally for discharging the air-conditioned air. As a result, it can be prevented that car passengers feel strange by inhaling the air from the air conditioning outlet port or that car passengers feel discomfort by the increase in noise in the vehicle interior caused by the intake noise.

According to Aspect 10, because the other end of the branching portion extends toward the intake duct from the bottom surface of the air conditioning duct, the air-conditioned air can be branched to be introduced to the battery while the main channel of the air-conditioned air can be directed toward the air conditioning outlet port. As a result, the influence on air conditioning can be suppressed, which allows the vehicle interior environment to be maintained comfortable.

According to Aspect 11, because the branching portion of the air conditioning duct includes the filter member, foreign substances can be prevented from entering the battery.

According to Aspect 12, because the air conditioning duel includes the upward-inclined portion or the upward step between the branching portion and the interior-housing air conditioning duct, condensation formed inside the air conditioning duct or water entering from the air conditioning outlet port can be received thereby, which can prevent the entry of water into the battery.

According to Aspect 13, because the branching portion of the air conditioning duct is disposed at a position where the branching portion is onset with respect to the muffling part of the exhaust pipe in a front and rear direction, the heat received from the muffling part that is increased in diameter can be suppressed, which can prevent a reduction in cooling efficiency caused by the received heat.

According to Aspect 14, the intake duct includes the vehicle-interior-air introducing port being arranged to introduce the vehicle interior air, and the air-conditioned-air introducing port, being arranged to introduce the air-conditioned air discharged from the air conditioning system. Therefore the battery can be cooled with the vehicle interior air and the air-conditioned air, and unevenness of temperature in the air supplied to the battery can be suppressed. In addition, because the interior-housing air conditioning duct that constitutes a part of the air conditioning duct is connected with the intake duct, the introduction portion of the vehicle interior air and the introduction portion of the air-conditioned air can be integrally formed and made compact in size. Further, because the connection portion between the interior-housing air conditioning duct and the intake duct is disposed inside the battery housing, it is unnecessary to protect the connection portion.

According to Aspect 15, because she intake port that is connected with the vehicle-interior-air introducing port is disposed under the seat, air in the vehicle interior can be taken in from a lower space where the air temperature is relatively low in the vehicle interior.

According to Aspect 16, because the vehicle interior air and the air-conditioned air can be mixed on the upstream side of the intake duct, and the mixed air can be supplied toward the battery, unevenness of temperature in the air supplied to the battery can be suppressed, which can make the cooling temperature for the battery even.

According to Aspect 17, the interior-housing air conditioning duct is housed in the cavity that is formed between the intake duet and the vertical wall of the lid member, constituting the battery housing. Such a dead space can be used effectively to prevent upsizing of the battery unit that could be caused by a configuration to house the interior-housing air conditioning duct.

According to Aspect 18, because the battery housing is disposed on the front lower side of the rear seat, which is a portion excluding the under-hip portion of the rear seat, the influence on the vehicle interior space can be suppressed. In addition, because the intake port is disposed under the rear seat and directed to the vehicle interior, the vehicle interior air can be taken in efficiently. Further, the intake pathway can be shortened to improve cooling efficiency of the battery.

According to Aspect 19, because directional characteristics can be added to the vehicle interior air in the intake duct by using the air-conditioned air, the cooling air can be made to flow more smoothly to improve the evenness in the cooling temperature.

DETAILED DESCRIPTION

Hereinafter, one embodiment of the present invention will be described by reference to the drawings. The drawings should be seen in a direction in which given reference numerals look properly. In the following description, front (Fr), rear(Rr), left(L), right(R), up(U) and down(D) denote directions as seen from a driver of the vehicle.

Figure 1:
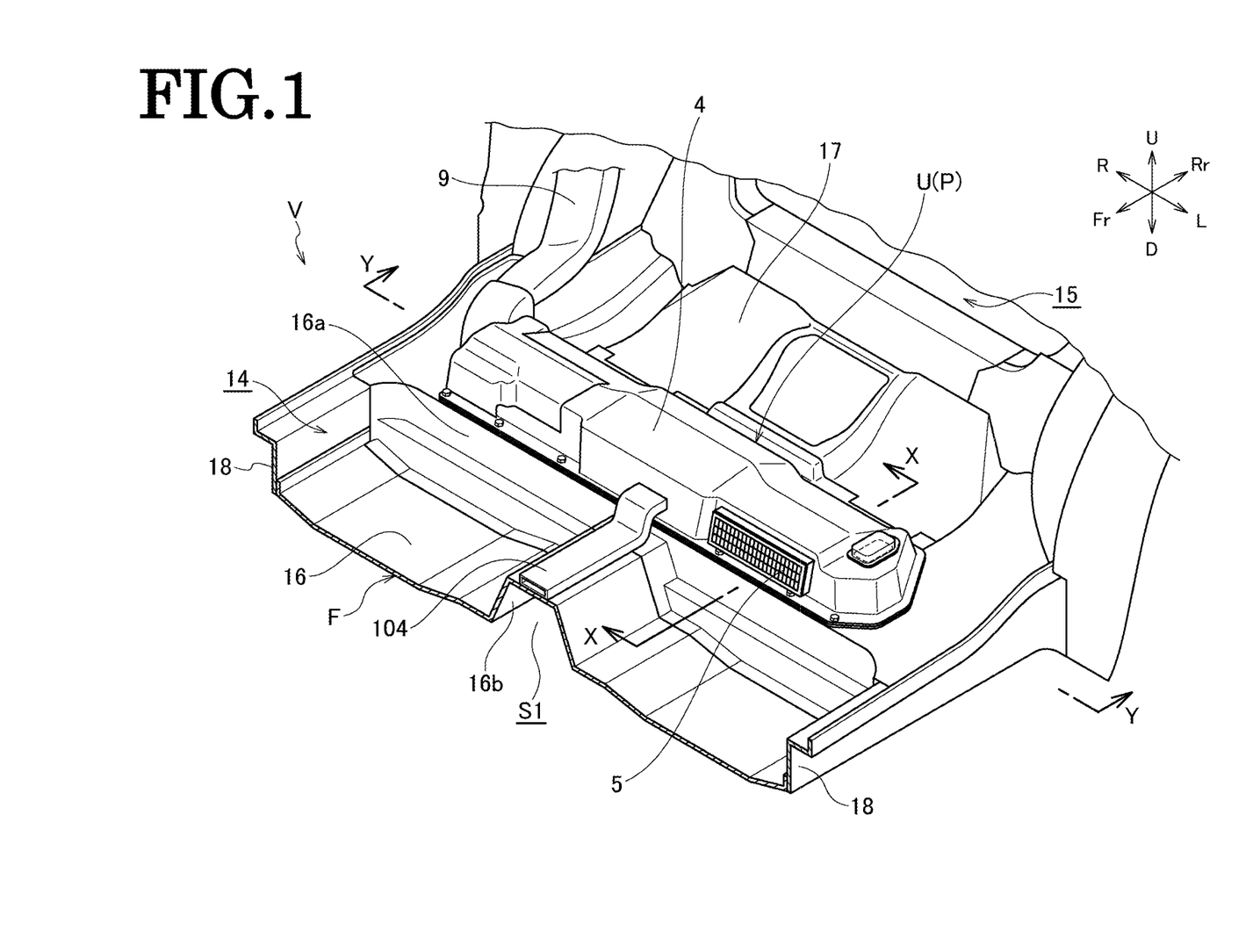
FIG. 1 is a perspective view of relevant components in a vehicle on which a battery unit according to one embodiment of the present invention is mounted.
Figure 2:
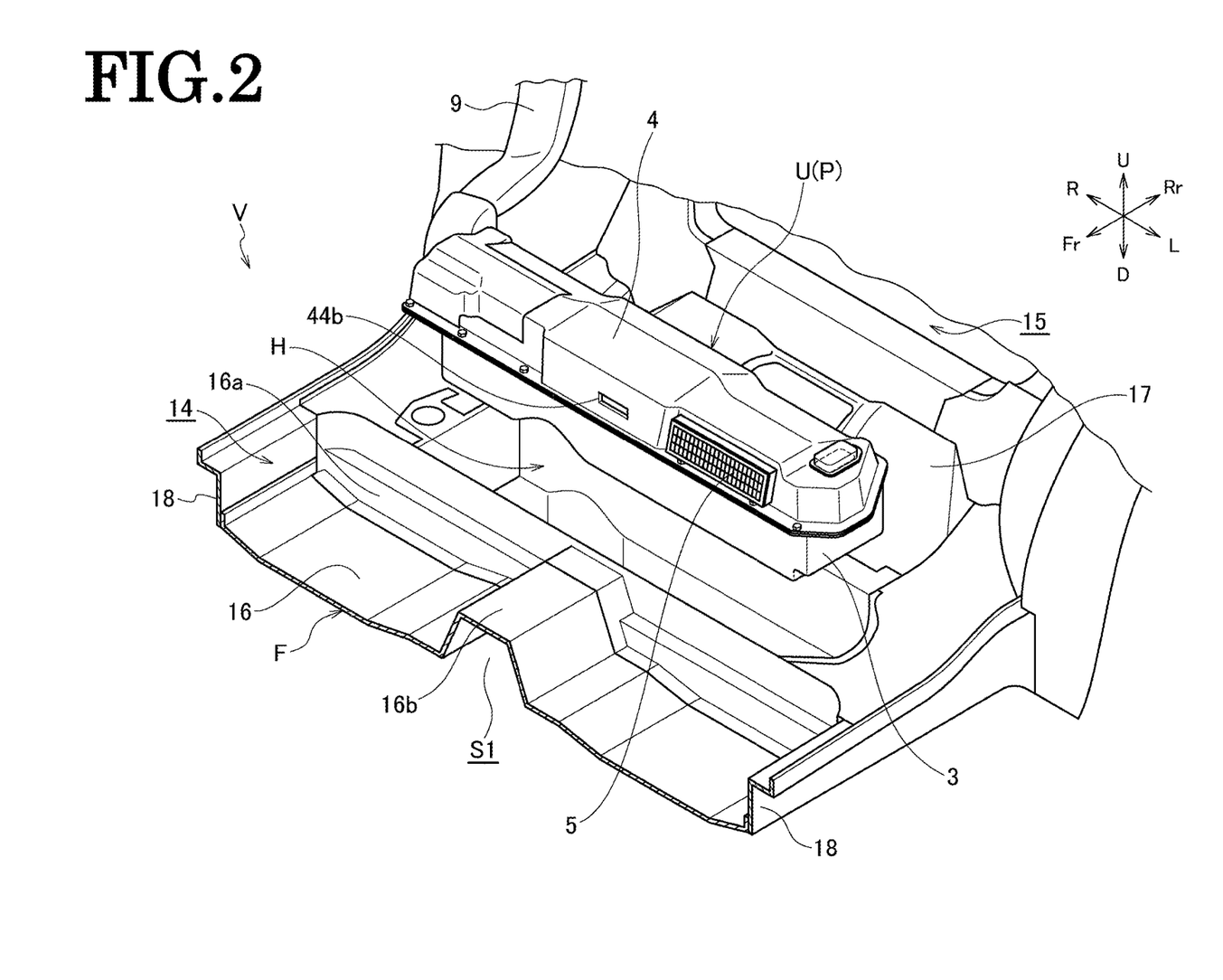
FIG. 2 is a perspective view of relevant components in a vehicle on which the battery unit is yet to be mounted.

A vehicle V according to the present embodiment shown in FIG. 1 and FIG. 2 is a hybrid vehicle, and a battery unit U to house a battery 1 is mounted on the vehicle V. The battery unit U is disposed in a housing concave part H that is recessed in a floor panel F, and is fastened to the floor panel F.

[Battery Unit]

First, a description of the battery unit V will be provided with reference to FIG. 1 to FIG. 6.

The battery unit V shown in FIG. 1 to FIG. 4 includes a case 3 and a lid member 4 that constitute a battery housing P that defines a container of the battery unit U, a battery 1 housed inside the battery housing P, an electric device D such as a DC/DC converter 2, and a cooling member C to cool the battery 1 and the like. The cooling member C includes an intake grille 5, an intake duct 6, an internal exhaust duct 7, a cooling fan 8, an interior-housing air conditioning duct 101, and the like.

Figure 4:
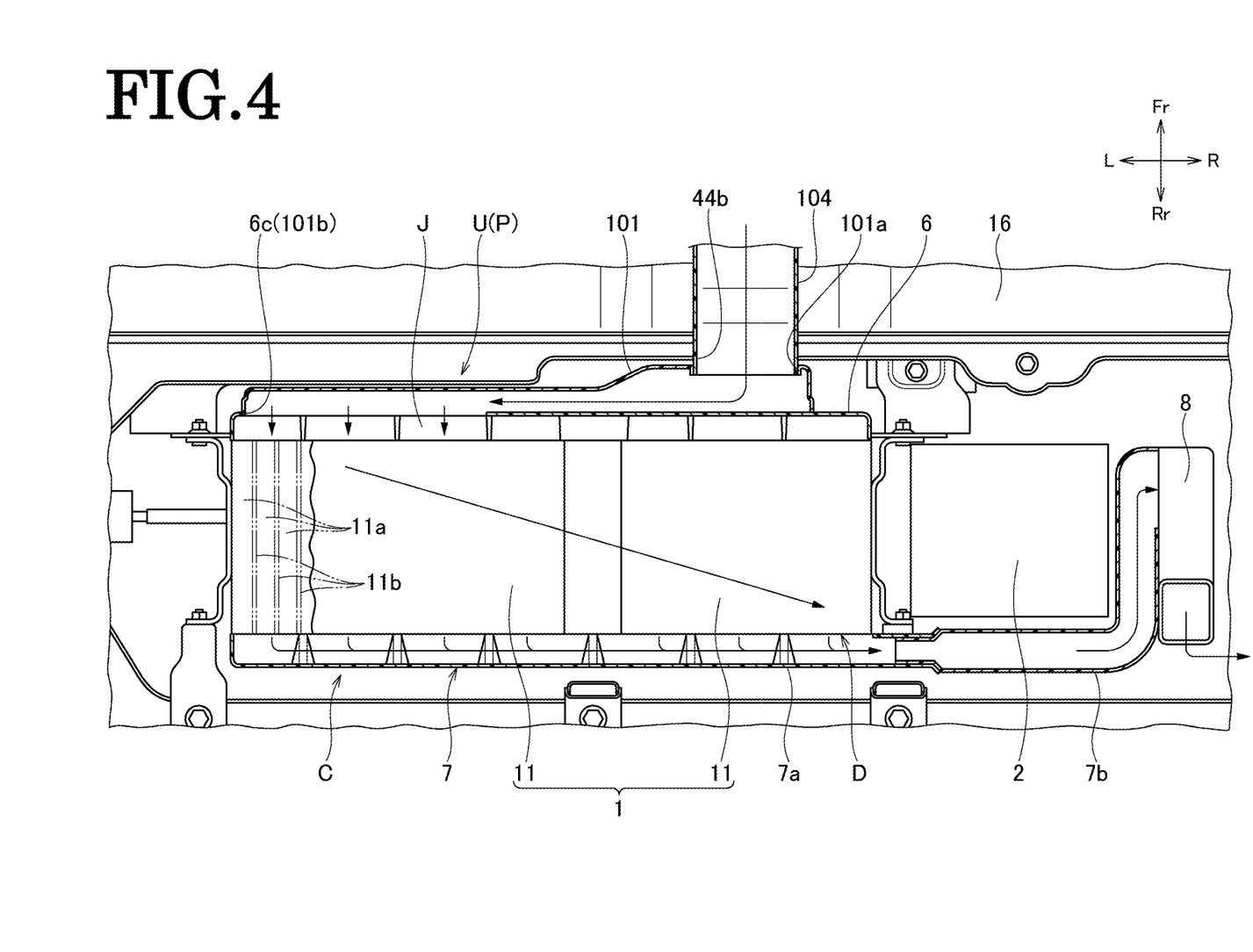
FIG. 4 is a cross-sectional view taken along the line Y-Y of FIG. 1.

The case 3 is a member made from resin having an approximately rectangular parallelepiped shape and having an opening at the upper side, and includes a case main body 31 having a box shape and the opening, and an annular flange portion 32 extending outward from a rim portion of the opening of the case main body 31. As shown in FIG. 4, in the case main body 31, the battery 1 is onset to be disposed on the left side while striding the center in the vehicle width direction (the right and left direction), and the DC/DC convener 2 is disposed on the right side.

The lid member 4 is a member to close the opening of the case main body 31, and has the top surface that supports a seat front side (a front side of an under-hip portion) of a rear seat 12. The lid member 4 includes a ceiling portion 43 having an approximately rectangle shape so as to almost correspond to the opening of the case main body 31, a vertical wall 44 having an approximately square frame shape that is provided to the ceiling portion 43 so as to droop integrally from the outer circumferential edge of the ceiling portion 43, and a flange portion 45 extending from the lower edge portion of the vertical wall 44 over the entire circumference.

In the vertical wall 44, the surface that faces forward includes a vehicle-interior-air introducing hole 44a through which the intake grille 5 is mounted, and a duet through-hole 44b disposed in a center portion through which air discharged from an air conditioning system (not illustrated) is introduced into the battery housing P (see FIG. 2). In addition, in the vertical wall 44, the surface that faces rightward includes an exhaust hole (not illustrated) used to connect an exhaust duct 9.

Figure 3:
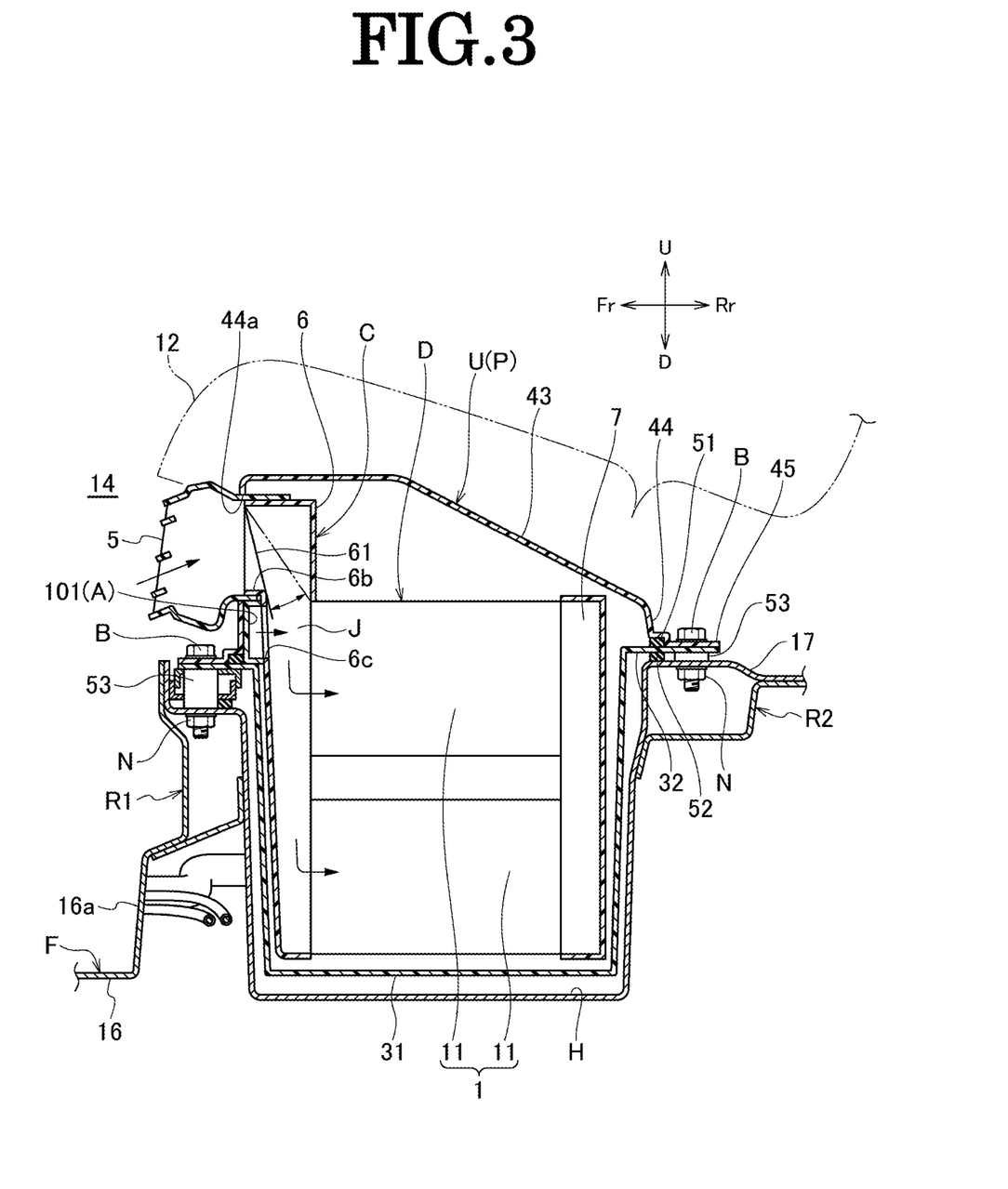
FIG. 3 is a cross-sectional view taken along the line X-X of FIG. 1.

As shown in FIG. 3, the flange portion 45 of the lid member 4 is overlaid on the flange portion 32 of the case 3 via an annular scaling member 51, and thus the lid member 4 and the case 3 are sealed. Both of the overlapping flange portions 32 and 45 are screwed on nuts N that are welded in advance onto the lower side of the floor panel F via collar members 53 mounted between both the flange portions 32 and 45 and the floor panel F by a plurality of bolts B that pass through both the flange portions 32 and 45 from above.

The battery 1 includes a plurality of battery modules 11. The battery modules 11 have a rectangle shape, and are housed in the battery housing P such that the longitudinal direction of the battery modules 11 is along the right and left direction (the vehicle width direction). A plurality of battery cells 11a that are vertically placed are arranged side by side in the right and left direction in each of the battery modules 11 as shown in FIG. 4. In the present specification, to place vertically means that the shortest side among the three sides extends in the right and left direction. In addition, cavities 11b to function as flow channels for cooling air are provided between the adjacent battery cells 11a.

The battery unit U according to the present embodiment includes four battery modules 11. Two of the battery modules 11 are disposed in the right and left direction while two of the battery modules 11 are disposed in the up and down direction in the battery housing P.

The cooling member C constitutes a cooling channel that takes the air in the vehicle interior 14 into the battery housing P, cools the battery 1 with the air that has been taken therein, and releases the air into a trunk 15 after the cooling. The intake grille 5 is mounted in the vehicle-interior-air introducing hole 44a provided to the vertical wall 44 of the lid member 4, and is arranged to take the air in the vehicle interior 14 from the front lower side of the rear seat 12 into the battery housing P.

The intake duct 6 in communication with the intake grille 5 is disposed in front of the battery 1 while the internal exhaust duct 7 in communication with the cooling fan 8 is disposed behind the battery 1. To be specific, the intake duct 6 and the internal exhaust duct 7 are disposed so as to be divided on both the from and rear sides in the battery housing P, and the battery 1, which is a subject to be cooled, is disposed between the intake duct 6 and the internal exhaust duct 7.

Figure 5:
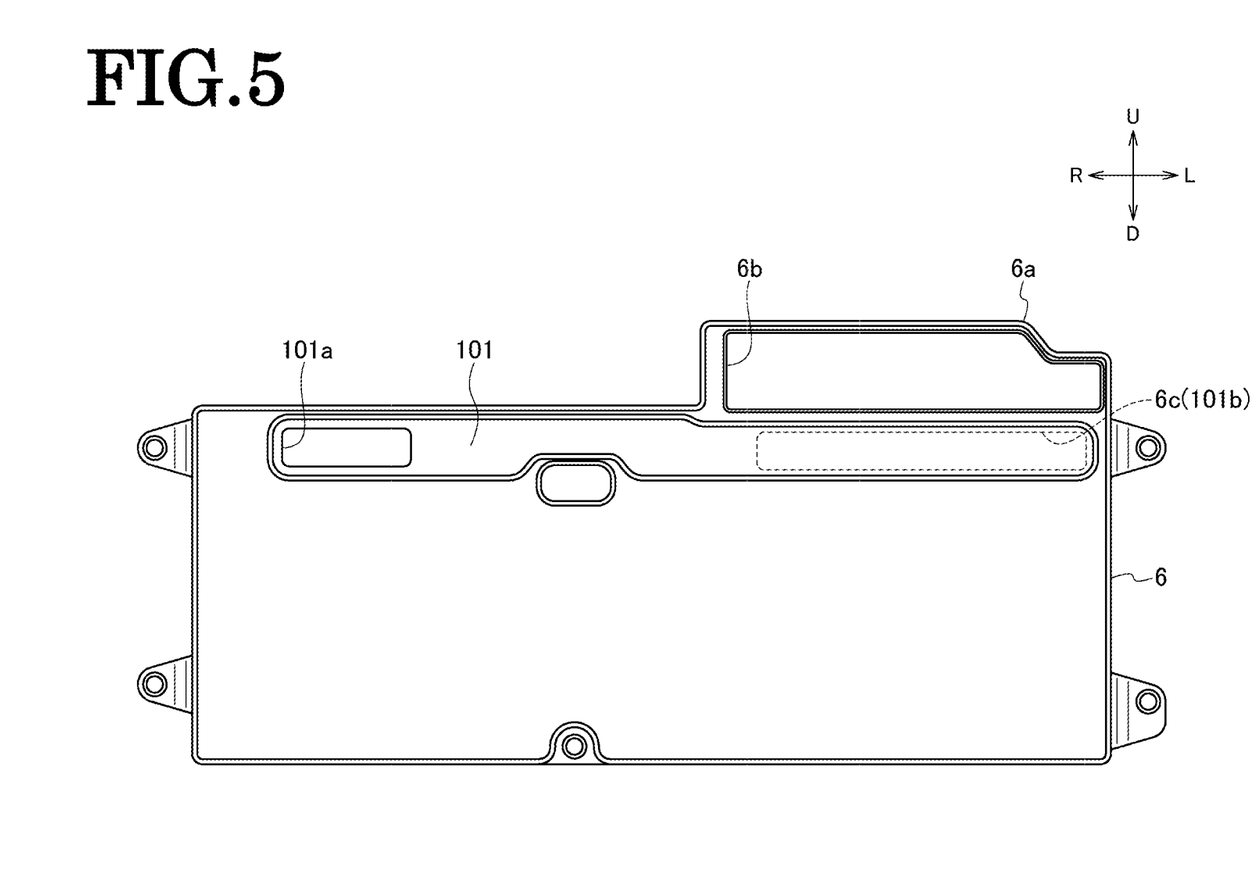
FIG. 5 is a from view of an intake duct and an interior-housing air conditioning duct.
Figure 7:
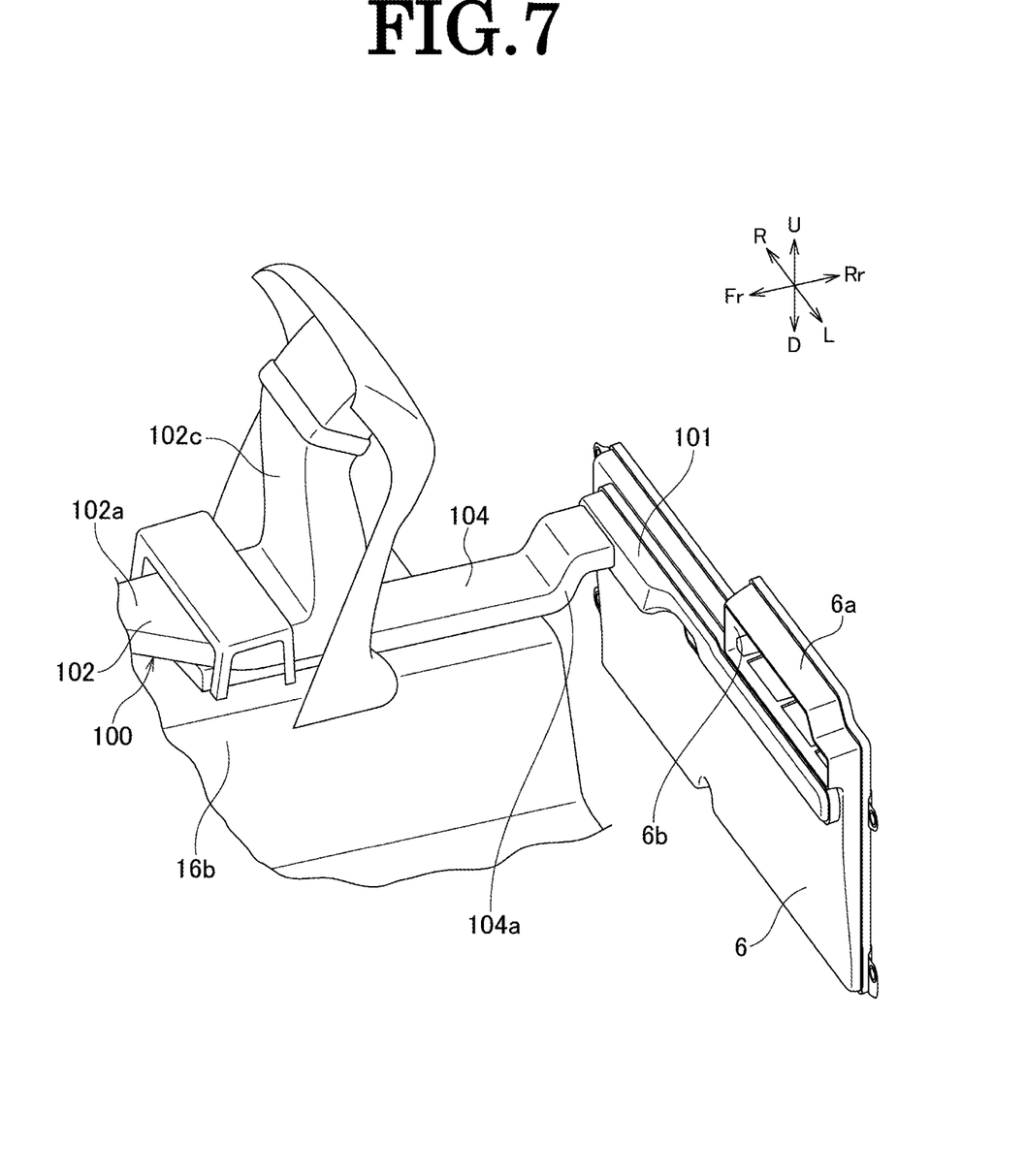
FIG. 7 is a perspective view of relevant components in a vehicle where the configuration and the layout of the air conditioning duct is illustrated.

As shown in FIG. 3, FIG. 5, and FIG. 7, the intake duct 6 includes a protruding portion 6a that protrudes upward on the upper left side thereof, and a vehicle-interior-air introducing port 6b that is wide in the right and left direction, disposed on the front side of the protruding portion 6a so as to be open toward the vehicle interior 14. The intake grille 5 fits to be connected with the vehicle-interior-air introducing port 6b, and introduces the air in the vehicle interior 14 into the intake duct 6. As shown in FIG. 3, the entire rear surface of the intake duct 6 is open toward the front surface of the battery 1. Thus, the vehicle interior air introduced from the vehicle-interior-air introducing port 6b flows downward and rightward along the intake duct 6 to flow into the cavities 11b between the battery cells 11a and the cavities between the battery modules 11, whereby the battery 1 is cooled.

As shown in FIG. 4, the internal exhaust duct 7 includes an internal exhaust duct main body 7a having its front surface open toward the rear surface of the battery 1, and a cooling-fan connecting duct 7b that passes behind the DC/DC convener 2 to connect the internal exhaust duct main body 7a with the cooling fan 8. The cooling fan 8 is in communication with the trunk 15 via the exhaust duct 9. When the cooling fan 8 is driven, the air in the vehicle interior 14 is introduced into the intake duct 6 inside the battery housing P through the intake grille 5. The vehicle interior air introduced into the intake duel 6 passes through the battery 1 to flow into the internal exhaust duet 7, whereby the battery 1 is cooled. The cooled air having flowed into the internal exhaust duct 7 is taken in the cooling fan 8 to be released into the trunk 15 through the exhaust duct 9.

further, the battery housing P houses the interior-housing air conditioning duct 101 that is a part of the air conditioning duct 100 connected with the air conditioning system in order to introduce air discharged from the air conditioning system to cool the battery 1 in a positive manner. The interior-housing air conditioning duct 101 is faced to the intake duct 6 and disposed on the front upper portion of the intake duct 6 along the right and left direction. The interior-housing air conditioning duct 101 according to the present embodiment has its entire rear surface open, and by covering this opening with the front surface of the intake duct 6, an air flow channel is formed. The interior-housing air conditioning duct 101 includes a duct connecting port 101a on its right end side that is wide in the right and left direction and open forward. The duct connecting port 101a is connected with the air conditioning duct 100 disposed outside of the battery housing P through the duct through-hole 44b provided to the vertical wall 44 of the lid member 4. Thus, the air-conditioned air discharged from the air conditioning system is introduced into the interior-housing air conditioning duct 101. The left end side of the interior-housing air conditioning duct 101 is in communication with an air-conditioned-air introducing port 6c that is wide in the right and left direction and provided to the intake duct 6. Thus, the air-conditioned air introduced from me duct connecting port 101a into the interior-housing air conditioning duct 101 is discharged into the intake duct 6 while using the air-conditioned-air introducing port 6c of the intake duct 6 as a discharge port 101b.

The discharge port 101b of the interior-housing air conditioning duct 101 is faced to the front side of the battery 1. The air-conditioned air discharged from the discharge port 101b merges with the vehicle interior air on the upstream side (a joint portion J) of the intake duct 6, and supplies to the battery 1 while being mixed with the vehicle interior air. To be specific, the intake grille 5 to take in the vehicle interior air is disposed adjacent to the vehicle-interior-air introducing port 6b of the intake duct 6 on the upstream side of the vehicle-interior-air introducing port 6b. The discharge port 101b (the air-conditioned-air introducing port 6c) of the interior-housing air conditioning duct 101 to introduce the air-conditioned air is disposed adjacent to the vehicle-interior-air introducing port 6b on the dowmstream side of the vehicle-interior-air introducing port 6b.

A one-way valve 61 to regulate a flow of the air from the discharge port 101b to the intake grille 5 is provided between the intake grille 5 and the discharge port 101b of the interior-housing air conditioning duct 101. The one-way valve 61 is arranged to regulate, for example, when the cooling fan 8 is under suspension while the air conditioning system is in operation, the air-conditioned air discharged from the discharge port 101b of the interior-housing air conditioning duct 101 so as to be prevented from flowing back to be discharged from the intake grille 5. The one-way valve 61 according to the present embodiment is a rubbery sheet member that is suspended from the vehicle-interior-air introducing port 6b of the intake duct 6. When the cooling fan 8 is in operation, the one-way valve 61 retracts under negative pressure inside the battery housing P or by the wind pressure of the vehicle interior air that is taken in from the intake grille 5 so that the vehicle-interior-air introducing port 6b is opened. Meanwhile, when the cooling fan 8 is under suspension and the air conditioning system is in operation, the one-way valve 61 keeps the vehicle-interior-air introducing port 6b closed by the wind pressure of the air-conditioned air that flows back and the like.

As shown in FIG. 3, the interior-housing air conditioning duct 101 according to the present embodiment is housed in the cavity A as the dead space formed inside the battery housing P. The cavity A is formed between the vertical wall 44 of the lid member 4 and the front surface of the intake duct 6 which extends to a position higher than the flange portion 32 of the case 3 or the flange portion of the lid member 4. The interior-housing air conditioning duct 101 according to the present embodiment is disposed inside the cavity A along the flange portions 32 and 45.

[Floor Structure]

Next, a description of the floor structure of the vehicle V will be provided with reference to FIG. 1 to FIG. 3, and FIG. 6.

As shown in FIG. 1 to FIG. 3, and FIG. 6, in the floor panel F of the vehicle V, a front floor panel 16 constituting a floor of the vehicle interior 14 is connected with a rear floor panel 17 constituting a floor of the trunk 15 and the like under the rear seat 12. Both the end sides of the floor panel F in the vehicle width direction are coupled with a pair of right and left frame members 18 extending along the front and rear direction.

A kick-up part 16a erecting upward is provided to a rear end portion of the front floor panel 16. In addition, a center tunnel 16b along the front and rear direction is provided in a center portion of the front floor panel 16 in the vehicle width direction. The center tunnel 16b is bent such that the front floor panel 16 projects upward, under which a tunnel space S1 having a trapezoidal shape is provided. The exhaust pipe 10 including a muffling part 10a that is increased in diameter is disposed in the tunnel space S1.

The housing concave part H is recessed on the front side of the rear floor panel 17, and houses the battery unit U. A front-side reinforcing part R1 and a rear-side reinforcing part R2 that stride the right and left frame members 18 are provided on the front side and the rear side of the housing concave part H. The battery unit U is fastened to the front-side reinforcing part R1 and the rear-side reinforcing part R2 in a sealing state by an annular sealing member 52. The front side of the rear seat 12 excluding the under-hip portion is disposed above the battery unit U. The intake grille 5 of the battery unit U is disposed on the front lower side of the rear seat 12 so as to be directed to the vehicle interior 14, and introduces the air in the vehicle interior 14 into the battery unit U.

A pair of right and left front seats (not illustrated) are provided in front of the rear seat 12, and the air conditioning system is disposed in front of the front seats. In addition, a center console 21 including a small article storage part 19, an arm rest 20, and the like is provided between the pair of right and left front seats.

[Configuration and Layout of Air Conditioning Duct]

Figure 6:
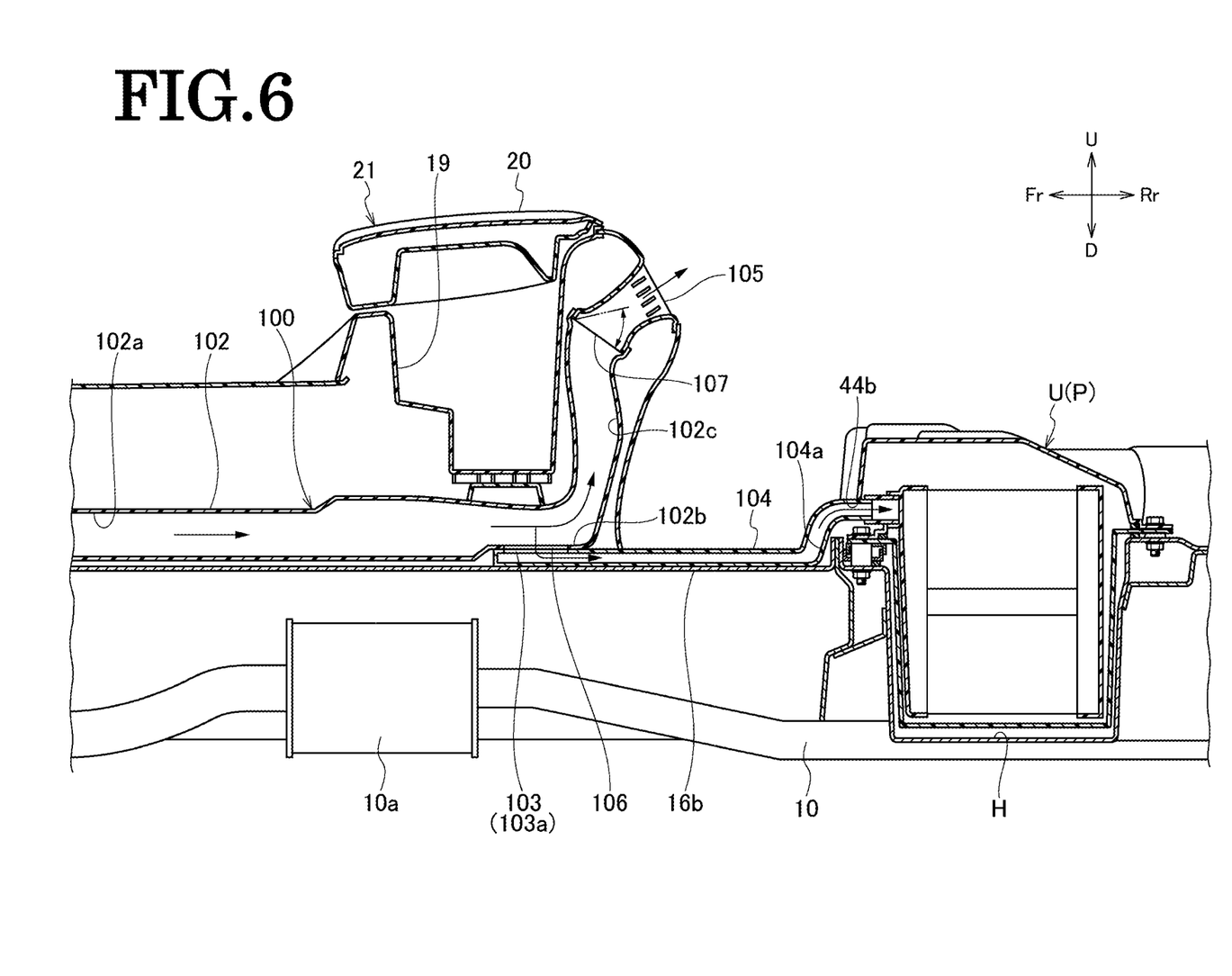
FIG. 6 is a cross-sectional view of relevant components in a vehicle where the configuration and the layout of the air conditioning duct is illustrated.

Next, a description of the configuration and the layout of the air conditioning duct 100 will be provided with reference to FIG. 6 and FIG. 7.

The air conditioning duel 100 includes an interior-console air conditioning duct 102 that is disposed inside the center console 21, a branching air conditioning duct 104 branched from the interior-console air conditioning duct 102 via a branching portion 103 to extend toward the battery unit U, and the interior-housing air conditioning duct 101 that is housed in the battery unit U.

The interior-console air conditioning duct 102 is configured to guide the air discharged from the air conditioning system to the air conditioning outlet port 105 disposed at un upper rear end portion of the center console 21. The interior-console air conditioning duct 102 includes a horizontal portion 102a disposed along the top surface of the center tunnel 16b in the center console 21, and an erecting portion 102c that erects from a bottom surface portion 102b of the horizontal portion 102a. The air conditioning outlet port 105 is connected with the upper end portion of the erecting portion 102c.

The branching portion 103 branches the horizontal portion 102a of the interior-console air conditioning duct 102 into the erecting portion 102c and the branching air conditioning duct 104 via a branching port 103a provided to the bottom surface portion 102b of the horizontal portion 102a. With this configuration, the air-conditioned air can be branched to be introduced to the battery unit U while the main channel of the air-conditioned air can be directed toward the air conditioning outlet port 105.

The branching port 103a includes a filter member 100 to regulate the passage of foreign substances. Any type of the filter member 106 can be used only if the filter member allows the passage of the air-conditioned air while regulating the passage of foreign substances. For example, a microporous mesh member can be used.

The branching portion 103 according to the present embodiment is disposed inside the center console 21. The exhaust pipe 10 is disposed along the front and rear direction under the branching portion 103. The branching portion 103 is disposed at a position where the branching portion 103 is offset with respect to the muffling part 10a of the of the exhaust pipe 10 in the front and rear direction. With this configuration, the heat received from the muffling part 10a that is increased in diameter and transferred to the branching portion 103 can be suppressed.

The branching air conditioning duct 104 is disposed along the top surface of the center tunnel 16b. The branching air conditioning duct 104 according to the present embodiment is a flat duct, whereby the influence on the vehicle interior space can be suppressed. The front end portion of the branching air conditioning duct 104 is connected with the branching port 103a of the branching portion 103 while the rear end portion is connected with the duct connecting port 101a of the interior-housing air conditioning duct 101 through the duct through-hole 44b of the battery unit U. With this configuration, the air-conditioned air branched at the branching portion 103 can be introduced into the intake duct 6 of the battery unit U via the branching air conditioning duct 104 and the interior-housing air conditioning duct 101.

The branching air conditioning duct 104 according to the present embodiment includes a step portion 104a that raises the flow channel of the air-conditioned air toward the downstream. To be specific, the step portion 104a rises from the rear end portion of the branching air conditioning duct 104, so that condensation formed inside the air conditioning duct 100 or water entering from the air conditioning outlet port 105 can be received thereby, which can prevent the entry of water into the battery unit U. Note that instead of the step portion 104a, an inclined portion that is inclined upward can also prevent the entry of water.

In addition, a one-way valve 107 is provided between the branching portion 103 and the air conditioning outlet port 105, the one-way valve 107 being arranged to regulate the air flow from the air conditioning outlet port 105 to the branching portion 103. The one-way valve 107 is arranged to prevent, for example, when the cooling fan 8 is in operation while the air conditioning system is under suspension, the vehicle interior air for cooling the battery 1 from being taken in from the air conditioning outlet port 105 via the interior-console air conditioning duct 102, the branching air conditioning duct 104, and the interior-housing air conditioning duct 101. The one-way valve 107 according to the present embodiment is made of a rubbery sheet member capable of opening and closing the air conditioning outlet port 105. When the air conditioning system is in operation, the one-way valve 107 retracts by the wind pressure of the air-conditioned air that is discharged from the air conditioning system to open the air conditioning outlet port 105. Meanwhile, when the air conditioning system is under suspension, the one-way valve 107 keeps the air conditioning outlet port 105 closed by its own weight.

In the cooling structure of the battery 1 thus configured, in cooling the battery 1, the air-conditioned air is discharged from the discharge port 101b into the intake duct 6 via the interior-console air conditioning duct 102, the branching air conditioning duct 104, and the interior-housing air conditioning duct 101 when the air conditioning system is in operation. The air-conditioned air discharged from the discharge port 101b and the vehicle interior air taken in from the intake grille 5 are mixed in the intake duct 6 to be supplied to the battery 1. Especially when the battery 1 needs to be cooled, for example, when the air conditioning system is in operation in a sun-heated car in summer where the temperature is high, cooling the battery 1 with the mixed air of the air-conditioned air and the vehicle interior air allows the battery 1 to be cooled more efficiently compared with a case where the battery 1 is cooled only with the vehicle interior air taken in from the intake grille 5.

As described above, according to the cooling structure of the battery 1 of the present embodiment, because the air conditioning duct 100 is connected with the intake duct 6 arranged to introduce the vehicle interior air, the battery 1 can be cooled with the vehicle interior air and the air-conditioned air in a positive manner, which can prevent the performance and the life of the battery 1 from being reduced by the temperature rise. In addition, it is unnecessary to provide a changeover valve, which can save the manufacturing cost. In addition, the vehicle interior air is introduced directly from the intake grille 5 connected with the intake duct 6 without being introduced through the air conditioning duet 100, which can prevent car passengers from feeling strange and discomfort.

In addition, because the discharge port 101b of the air conditioning duct 100 is connected with the joint portion J disposed on the upstream side of the intake duct 6, the vehicle interior air and the air-conditioned air can be mixed on the upstream side of the intake duct 6, allowing the mixed air to be supplied toward the battery 1. This configuration can suppress unevenness of temperature in the air supplied to the battery 1, which can make the cooling temperature for the battery 1 even.

In addition, because the interior-housing air conditioning duct 101 is arranged along the intake duct 6 with facing to each other, and the discharge port 101b is disposed on the downstream side of the interior-housing air conditioning duct 101, heat exchange between the interior-housing air conditioning duct 101 and the intake duct 6 can lower the air temperature inside the intake duct 6.

In addition, because the interior-housing air conditioning duct 101 is housed together with the intake duct 6 in the battery housing P, not only the ducts can be protected but also the assembly workability can be improved.

In addition, because the discharge port 101b of the air conditioning duct 100 is opposed to the front surface of the battery 1, pressure loss can be reduced by directing the air-conditioned air toward the battery 1.

In addition, because the one-way valve 61 arranged to regulate the air flow from the discharge port 101b, from which the air-conditioned air is discharged into the intake duct 6, to the intake grille 5 is provided, the air-conditioned air that flows back can be prevented from being discharged from the intake grille 5, which can prevent car passengers from feeling discomfort.

In addition, because the air conditioning duct 100 that is connected with the air conditioning outlet port 105 is branched to introduce the air-conditioned air to the battery 1, the air-conditioned air can be introduced while the influence on air conditioning can be suppressed, whereby the battery 1 can be cooled in a positive manner. In addition, compared with a case where a dedicated air conditioning duct extending from the air conditioning system is installed in the battery 1, not only the number of parts of the air conditioning duct 100 can be reduced, but also the increase of weight can be prevented.

In addition, because the battery 1 is disposed under the rear seat 12, and the branching portion 103 of the air conditioning duct 100 is disposed inside the center console 21, not only the installation of the air conditioning duct 100 can be simplified, but also the influence on the vehicle interior space can be reduced.

In addition, because the one-way valve 107 is provided between the branching portion 103 of the air conditioning duct 100 and the air conditioning outlet port 105, the one-way valve 107 being arranged to regulate the air flow from the air conditioning outlet port 105 to the branching portion 103, the vehicle interior air to cool the battery 1 can be prevented from being taken in from the air conditioning outlet port 105 that is originally for discharging the air-conditioned air. As a result, it can be prevented that car passengers feel strange by inhaling the air from the air conditioning outlet port 105 or that car passengers feel discomfort by the increase in noise in the vehicle interior caused by the intake noise.

In addition, because the branching air conditioning duct 104 connected with the branching portion 103 extends toward the intake duct 6 from the bottom surface portion 102b of the interior-console air conditioning duct 102, the air-conditioned air can be branched to be introduced to the battery 1 while the main channel of the air-conditioned air can be directed toward the air conditioning outlet port 105. As a result, the influence on air conditioning can be suppressed, which allows the vehicle interior environment to be maintained comfortable.

In addition, because the branching portion 103 of the air conditioning duct 100 includes the filter member 106, foreign substances can be prevented from entering the battery 1.

In addition, because the air conditioning duct 100 includes the upward step portion 104a between the branching portion 103 and the interior-housing air conditioning duct 101, condensation made inside the air conditioning duct 100 or water entering from the air conditioning outlet port 105 can be received thereby, which can prevent the entry of water into the battery 1.

In addition, because the branching portion 103 of the air conditioning duct 100 is disposed at the position where the branching portion 103 is offset with respect to the muffling part 10a of the exhaust pipe 10 in the front and rear direction, the heat received from the muffling part 10a that is increased in diameter can be suppressed, which can prevent a reduction in cooling efficiency caused by the received heat.

According to the battery unit U of the present embodiment, because the intake duct 6 includes both of the vehicle-interior-air introducing port 6b arranged to introduce the vehicle interior air and the air-conditioned-air introducing port 6c arranged to introduce the air-conditioned air discharged from the air conditioning system, the battery 1 can be cooled with the vehicle interior air and the air-conditioned air while unevenness of temperature in the air supplied to the battery 1 can be suppressed. In addition, because the interior-housing air conditioning duct 101 that constitutes a part of the air conditioning duct 100 is connected with the intake duct 6, the introduction portion of the vehicle interior air and the introduction portion of the air-conditioned air can be integrally formed and made compact in size. Further, because the connection portion between the interior-housing air conditioning duct 101 and the intake duct 6 is disposed inside the battery housing, it is unnecessary to protect the connection portion.

In addition, because the intake grille 5 that is connected with the vehicle-interior-air introducing port 6b is disposed under the rear seat 12, the air in the vehicle interior 14 can be taken in from the lower space where the air temperature is relatively low in the vehicle interior 14.

In addition, because the intake grille 5 is disposed adjacent to the vehicle-interior-air introducing port 6b on the upstream side of the vehicle-interior-air introducing port 6b, and the air-conditioned-air introducing port 6c is disposed adjacent to the vehicle-interior-air introducing port 6b on the downstream side of the vehicle-interior-air introducing port 6b, the vehicle interior air and the air-conditioned air can be mixed on the upstream side of the intake duct 6, allowing the mixed air to be supplied toward the battery 1. Thus, unevenness of temperature in the air supplied to the battery 1 can be suppressed, which can uniform the cooling temperature for the battery 1.

In addition, because the interior-housing air conditioning duct 101 is housed in the cavity A being formed between the intake duct 6 and the vertical wall 44 of the lid member 4 constituting the battery housing P, the dead space can be used effectively to prevent upsizing of the battery unit U that could be caused by a configuration to house the interior-housing air conditioning duct 101.

In addition, because the battery housing P is disposed on the front lower side of the rear seat 12, which is a portion excluding the under-hip portion of the rear seat 12, the influence on the vehicle interior space can be lowered. In addition, because the intake grille 5 is disposed under the rear seat 12 and directed to the vehicle interior 14, the vehicle interior air can be taken in efficiently. Further, the intake pathway can be shortened to improve cooling efficiency of the battery 1.

Figure 8:
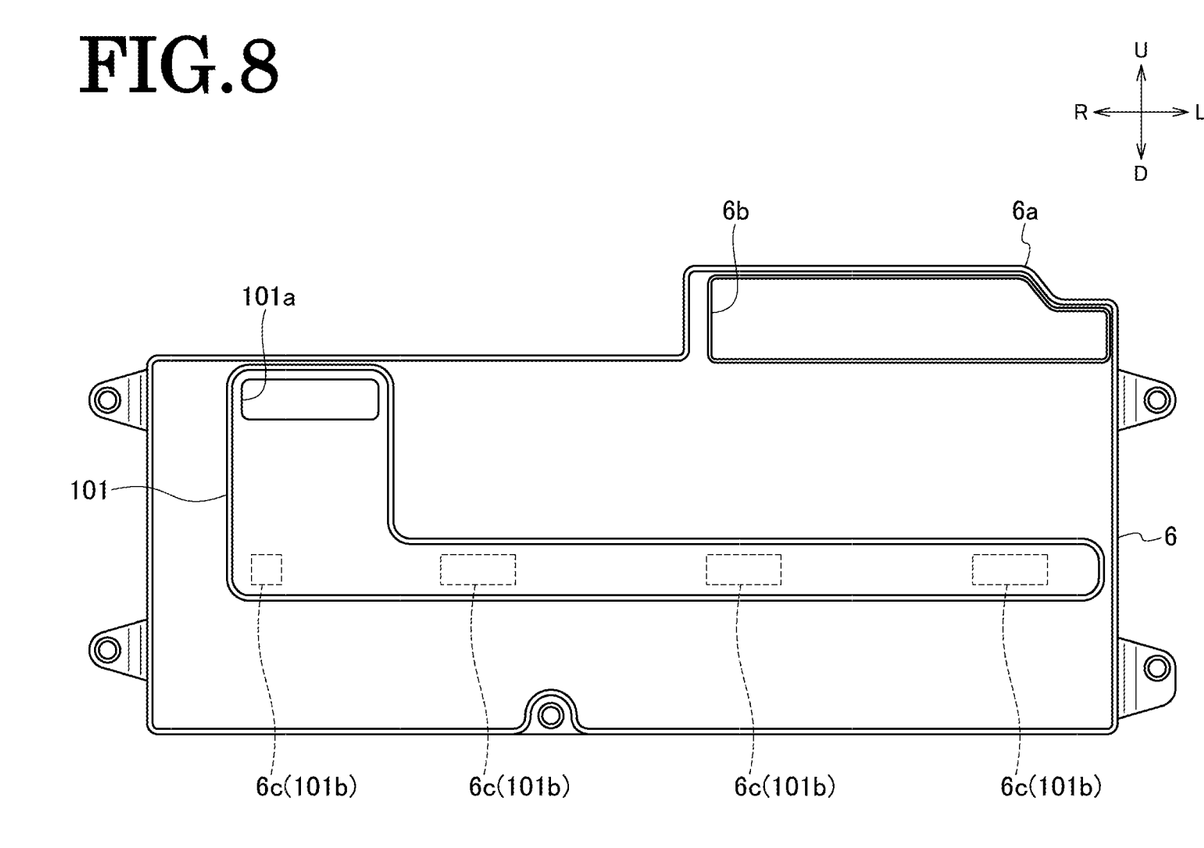
FIG. 8 is a front view of a modified example of an intake duct and an interior-housing air conditioning duct.

Next, a description of a modified example of the intake duct 6 and the interior-housing air conditioning duct 101 will be provided with reference to FIG. 8. Note that the same reference numerals are provided to the same components as those in the above-described embodiment, and only different respects will be explained.

The intake duct 6 and the interior-housing air conditioning duct 101 shown in FIG. 8 differ from the above-described embodiment as to the position where the air-conditioned air is discharged into the intake duct 6. To be specific, a plurality of air-conditioned-air introducing ports 6c of the intake duct 6 are disposed not at a lower adjacent position with respect to the vehicle-interior-air introducing port 6b but at a position intermediate in the height direction of the intake duct 6 so as to be dispersed in the right and left direction. This configuration allows, when the battery 1 includes a plurality of battery modules 11, the air-conditioned-air introducing ports 6c to be made open individually toward the battery modules 11, or to be made open toward positions where cooling air is likely to stagnate, which can improve the cooling efficiency.

The present invention is not limited to the embodiment and the modified example which have been described heretofore and hence can be modified or improved as required.

For example, while described in the above embodiment is the configuration in which the entirely-opened rear surface opening of the interior-housing air conditioning duct 101 is covered with the flout surface of the intake duct 6 to form an air flow channel, a configuration may be adopted in which the interior-housing air conditioning duct 101 has a closed cross section structure to constitute an air flow channel by itself, and the discharge port 101b of the interior-housing air conditioning duct 101 is in communication with the air-conditioned-air introducing port 6c of the intake duct 6

In addition, the air-conditioned-air introducing port 6c may be disposed anywhere in a flow channel connecting the vehicle-interior-air introducing port 6b with the battery 1.

In addition, a configuration may be adopted in which a dedicated air conditioning duct extending from the air conditioning system is provided instead of branching the air conditioning duct connected with the air conditioning outlet port. This configuration allows the air-conditioned air to be introduced from the air conditioning system into the intake duct according to a cooling request from the battery 1 without being limited to the case where the air conditioning system is made in operation according to a cooling request from a car passenger.

The invention claimed is:

1. A cooling structure of a battery, comprising:
   a battery;
   an intake port, from which air in a vehicle interior is taken in; and
   an intake duct, which is in communication with the intake port and from which the air in the vehicle interior is introduced to the battery,
   wherein the intake duct is connected with a discharge port of an air conditioning duct, which is connected with an air conditioning system, and from which air discharged from the air conditioning system is introduced,
   wherein the discharge port of the air conditioning duct is connected with a joint portion disposed on an upstream side of the intake duct, and
   wherein the joint portion mixes the air in the vehicle interior and the air discharged from the air from the air conditioning system and then introduces mixed air into the battery.

2. The cooling structure of the battery according to claim 1, wherein:
   a part of the air conditioning duct is arranged along the intake duct with facing to each other; and
   the discharge port is disposed at a downstream of the part of the air conditioning duct.

3. The cooling structure of the battery according to claim 1, wherein:
   the battery and the intake duct are housed in a battery housing while an interior-housing air conditioning duct, which constitutes a part of the air conditioning duct, is also housed in the battery housing; and
   the discharge port is disposed in the interior-housing air conditioning duct.

4. The cooling structure of the battery according to claim 1, wherein
   the discharge port is opposed to the battery.

5. The cooling structure of the battery according to claim 1, wherein
   a one-way valve is provided between the intake port and the discharge port, the one-way valve being arranged to regulate an air flow from the discharge port to the intake port.

6. The cooling structure of the battery according to claim 1, wherein
   the air conditioning duct includes a branching portion, one end of the branching portion being connected with an air conditioning outlet port that is open toward the vehicle interior, and the other end of the branching portion being connected with the intake duct.

7. The cooling structure of the battery according to claim 6, wherein:
   the battery is disposed under a rear seat; and
   the branching portion is disposed inside a center console, which is provided between a pair of front seats.

8. The cooling structure of the battery according to claim 7, wherein
   a one-way valve is provided between the branching portion and the air conditioning outlet port, the one-way valve being arranged to regulate an air flow from the air conditioning outlet port to the branching portion.

9. The cooling structure of the battery according to claim 7, wherein:
   a part of the air conditioning duct is disposed on a floor panel,
   the part includes an erecting portion; which erects from a bottom surface, and
   the one end of the branching portion is connected with the air conditioning outlet port via the erecting portion while the other end of the branching portion extends toward the intake duct from the bottom surface.

10. The cooling structure of the battery according to claim 9, wherein
    the branching portion includes a filter member.

11. The cooling structure of the battery according to claim 10, wherein:
    the battery and the intake duct are housed in a battery housing while an interior-housing air conditioning duct, which constitutes a part of the air conditioning duct, is also housed in the battery housing; and
    the air conditioning duct includes one of an upward-inclined portion and an upward step between the branching portion and the interior-housing air conditioning duct.

12. The cooling structure of the battery according to claim 9, further comprising under the floor panel:
- an exhaust pipe; and
- a muffling part, which is provided to the exhaust pipe, wherein
- the branching portion is disposed alt a position where the branching portion is offset with respect to the muffling part in a front and rear direction.

13. A battery unit comprising:
- a battery;
- an intake duct, from which air in a vehicle interior is introduced; and
- a battery housing, which is arranged to house the battery and the intake duct,
- wherein the battery housing houses an interior-housing air conditioning duct that constitutes a part of an air conditioning duct, which is connected with an air conditioning system, and from which air discharged from the air conditioning system is introduced,
- wherein the intake duct has a vehicle-interior-air introducing port, which is arranged to introduce the vehicle interior air, and an air-conditioned-air introducing port, which is arranged to introduce the air discharged from the air conditioning system, and
- wherein the interior-housing air conditioning duct is connected to the intake duct housed in the battery housing.

14. The battery unit according to claim 13, further comprising an intake port, which is connected with the vehicle—interior-air introducing port, and which is disposed under a seat.

15. The battery unit according to claim 14, wherein:
- the intake port is disposed adjacent to the vehicle-interior-air introducing port and upstream of the vehicle-interior-air introducing port; and
- the air-conditioned-air introducing port is disposed adjacent to the vehicle interior-air introducing port and downstream of the vehicle-interior-air introducing port.

16. The battery unit according to claim 15, wherein:
the battery housing comprises:
- a case, which has a box shape with an opening portion; and
- a lid member, which is arranged to cover the opening portion;
- the case and the lid portion are sealed via flange portions of the case and the lid member;
- the intake duct extends above the flange portions;
- a cavity is provided between a vertical wall of the lid member and the intake duct; and
- the interior-housing air conditioning duct is disposed along the flange portions in the cavity.

17. The battery unit according to claim 14, wherein:
- the battery housing is disposed on a front lower side of a rear seat; and
- the intake port is disposed under the rear seat and directed to the vehicle interior.

18. The battery unit according to claim 13, wherein:
- the battery comprises a plurality of battery modules; and
- the air-conditioned-air introducing port is open toward each of the battery modules.

* * * * *